(12) United States Patent
Unes et al.

(10) Patent No.: US 9,546,724 B2
(45) Date of Patent: Jan. 17, 2017

(54) ROLLER PIN FOR CAM ACTUATED ROLLER ASSEMBLY

(71) Applicant: Caterpillar Inc., Peoria, IL (US)

(72) Inventors: John W. Unes, Chillicothe, IL (US); David C. Mack, Peoria, IL (US); Adam C. Hill, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 371 days.

(21) Appl. No.: 14/153,106

(22) Filed: Jan. 13, 2014

(65) Prior Publication Data

US 2015/0198229 A1 Jul. 16, 2015

(51) Int. Cl.
| F16J 1/10 | (2006.01) |
| F16H 53/06 | (2006.01) |
| F02M 59/10 | (2006.01) |
| F16H 57/04 | (2010.01) |
| F02M 63/00 | (2006.01) |

(52) U.S. Cl.
CPC ............ *F16H 53/06* (2013.01); *F02M 59/102* (2013.01); *F02M 63/0001* (2013.01); *F16H 57/043* (2013.01); *Y10T 29/49293* (2015.01); *Y10T 74/2107* (2015.01)

(58) Field of Classification Search
CPC .................................. F16H 3/06; F16H 57/041
USPC ........................................................ 92/129
See application file for complete search history.

(56) References Cited

U.S. PATENT DOCUMENTS

| 4,865,922 A | 9/1989 | Davies |
| 5,490,443 A | 2/1996 | Atsuta |
| 6,042,778 A | 3/2000 | Kraft et al. |
| 6,056,442 A * | 5/2000 | Ono ........................ F01L 1/181 |
| | | 384/286 |
| 6,210,503 B1 * | 4/2001 | Naylor ...................... C22C 9/04 |
| | | 123/90.39 |
| 6,598,571 B1 * | 7/2003 | Harimoto .................. F01L 1/18 |
| | | 123/90.25 |
| 7,954,999 B2 | 6/2011 | Singer et al. |
| 2008/0006233 A1 * | 1/2008 | Bartley ................... F01L 1/146 |
| | | 123/90.48 |
| 2009/0038572 A1 | 2/2009 | Langewisch |

FOREIGN PATENT DOCUMENTS

DE   102010031446   1/2012

* cited by examiner

*Primary Examiner* — Thomas E Lazo
*Assistant Examiner* — Daniel Collins

(57) ABSTRACT

The present disclosure provides a roller pin for a fuel pump. The roller pin includes a cylindrical body made of a first material extending between a first end and a second end. The roller pin includes an intermediate portion disposed between the first end and the second end of the cylindrical body. The intermediate portion is formed by depositing a second material on the cylindrical body. The roller pin further includes a longitudinal groove extending along the intermediate portion.

20 Claims, 5 Drawing Sheets

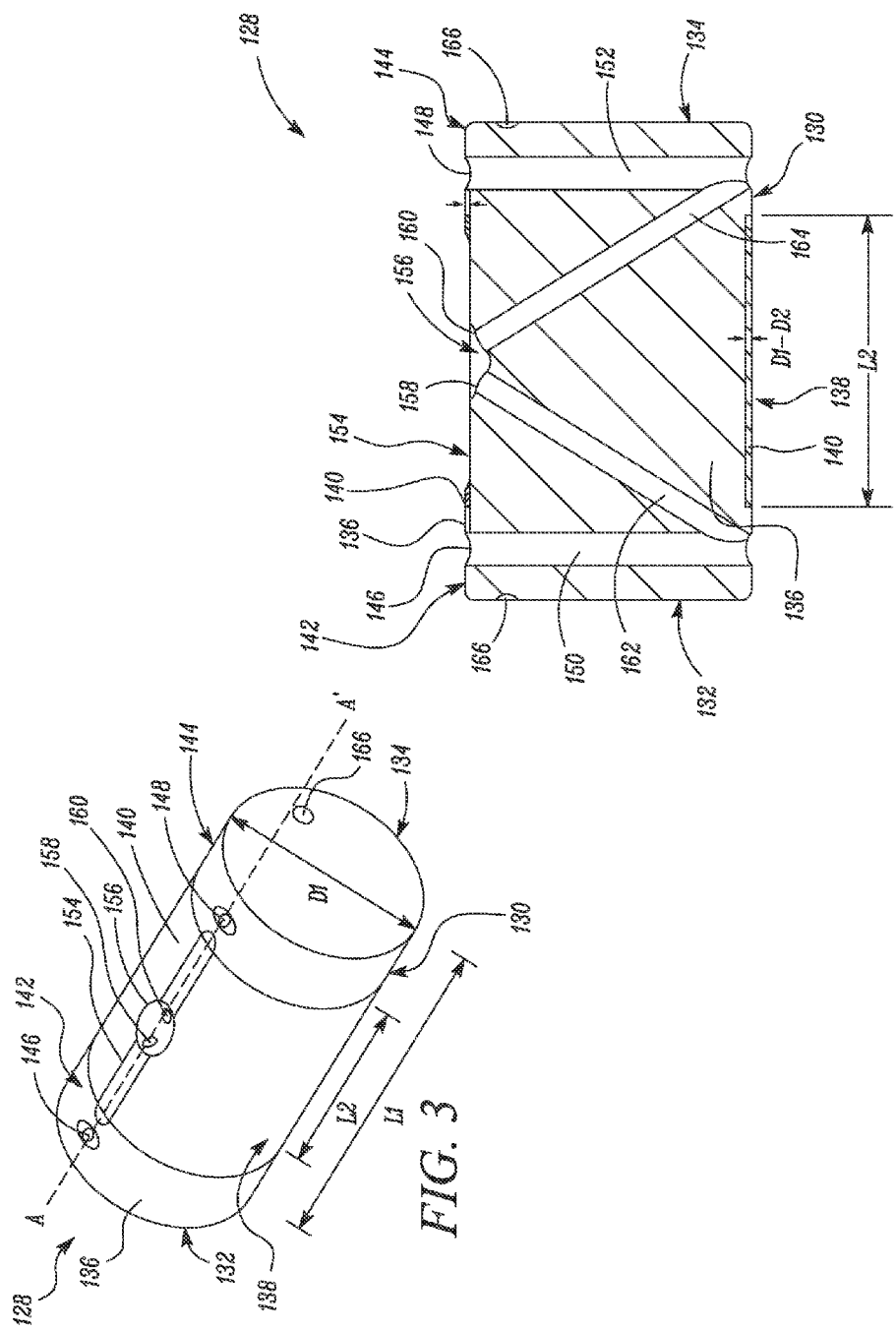

US 9,546,724 B2

ROLLER PIN FOR CAM ACTUATED ROLLER ASSEMBLY

TECHNICAL FIELD

The present disclosure relates to a cam actuated roller assembly, and more particularly to a roller pin for the cam actuated roller assembly.

BACKGROUND

Typically, a cam follower used in a high-pressure fuel pump or a valve drive of an internal combustion engine includes a cam roller rotatably supported on a roller pin. The cam roller and the roller pin may be manufactured from carburized heat-resistant steel alloy. The roller pin includes a load bearing surface. Due to close tolerances, the cam roller and the roller pin experience a frictional force between them which may result in wear of the abutting surfaces, and in some cases this may lead to a failure of the roller pin and/or the cam roller. Alternatively, a roller pin manufactured from a friction resisting material such as bronze reduces the frictional forces between the abutting surfaces. However, due to pliability of bronze, the life of the roller pin may be affected at the load bearing surface of the roller pin. Moreover, a roller pin may be manufactured by attaching a layer of bronze over a steel body of the roller pin by known processes such as welding, but prolonged operation of the roller pin results in uneven wear of the roller pin at the load bearing surface.

U.S. Pat. No. 6,042,778 discloses a sliding bearing which is multilayered, self-lubricating and maintenance-free. The bearing includes a metallic supporting body; and a layer of sintered bronze which is provided on the metallic supporting body and which has pores filled with polytetrafluoroethylene (PTFE) to provide a PTFE-impregnated sintered bronze layer, the PTFE being uniformly distributed and serving as a solid lubricant, and the PTFE-impregnated sintered bronze layer having a sliding surface composed of the PTFE particles but no PTFE cover layer.

SUMMARY

In one aspect, the present disclosure provides a roller pin for a fuel pump. The roller pin includes a cylindrical body made of a first material extending between a first end and a second end. The roller pin includes an intermediate portion disposed between the first end and the second end of the cylindrical body. The intermediate portion is formed by depositing or cladding a second material on the cylindrical body. The roller pin further includes a longitudinal groove extending along the intermediate portion.

In one aspect, the present disclosure provides a fuel pump comprising at least one cam actuated roller assembly. The cam actuated roller assembly includes a cam follower defining a cavity, and a cam roller accommodated in the cavity. The cam roller defines a bore. The cam actuated roller assembly further includes a roller pin received in the bore and extending into the cavity. The roller pin includes a cylindrical body made of a first material extending between a first end and a second end. The roller pin includes an intermediate portion disposed between the first end and the second end of the cylindrical body. The intermediate portion is formed by depositing a second material on the cylindrical body. The roller pin further includes a longitudinal groove extending along the intermediate portion.

In another aspect, the present disclosure provides a method of manufacturing a roller pin for a fuel pump. The method includes removing a first material from an outer surface of a cylindrical body to define an annular undercut portion between a first end and a second end of the cylindrical body. The method includes depositing a layer of a second material over the undercut portion by thermo-metal spraying to form an intermediate portion. The method includes removing a portion of the layer of the second material from the intermediate portion to define a longitudinal groove. The method further includes providing a concave cavity within the longitudinal groove.

Other features and aspects of this disclosure will be apparent from the following description and the accompanying drawings.

BRIEF DESCRIPTION OF THE DRAWINGS

FIG. 3 illustrates a perspective view of a roller pin associated with a cam actuated roller assembly;

FIG. 4 illustrates a cross-sectional view of the roller pin;

DETAILED DESCRIPTION

The present disclosure relates to a cam actuated roller assembly and more particularly to a roller pin for the cam actuated roller assembly. References will now be made in detail to specific embodiments or features, examples of which are illustrated in the accompanying drawings. Generally, similar reference numbers will be used throughout the drawings to refer to the same or corresponding parts.

Figure 1:
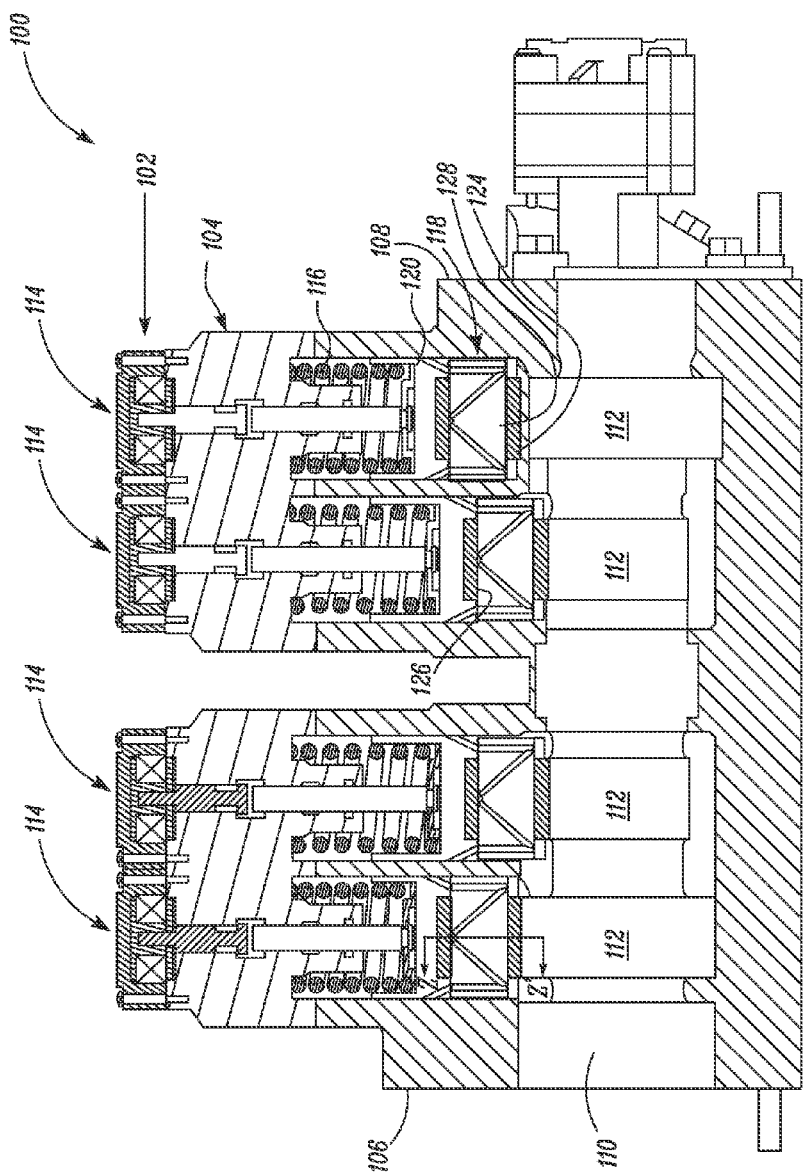
FIG. 1 illustrates a cross-sectional view of an exemplary fuel pump.

FIG. 1 illustrates a cross-sectional view of a fuel pump 100, according to an exemplary embodiment of the present disclosure. In an embodiment, the fuel pump 100 may be a high pressure fuel pump. The fuel pump 100 may be coupled to an engine (not shown) such that the fuel pump 100 may receive a fuel from a fuel supply system 102 and may provide pressurized fuel into a common rail (not shown). The common rail supplies the fuel to one or more cylinders of the engine, as commonly known in the art.

The fuel pump 100 includes a fuel pump housing 104 having a front end 106 and a rear end 108. The fuel pump housing 104 encloses a camshaft 110 extending from the front end 106 to the rear end 108. The camshaft 110 may include at least one set of cam lobes 112 disposed along the length of the camshaft 110. The fuel pump 100 may further include at least one plunger assembly 114 configured to reciprocate within the fuel pump housing 104. The cam lobes 112 are spaced apart along the length of the camshaft 110 such that each of the cam lobes 112 may correspond to at least one of the plunger assembly 114. In various alternative embodiments, each set of the cam lobes 112 may include one or more cam lobes 112. Although the fuel pump 100 is illustrated as an inline plunger or piston pump, those skilled in the art may understand that the fuel pump 100 may include, but not limited to, an axial piston pump, a radial piston pump, a bent axis pump, an inlet metered pump, or an outlet metered pump.

Figure 2:
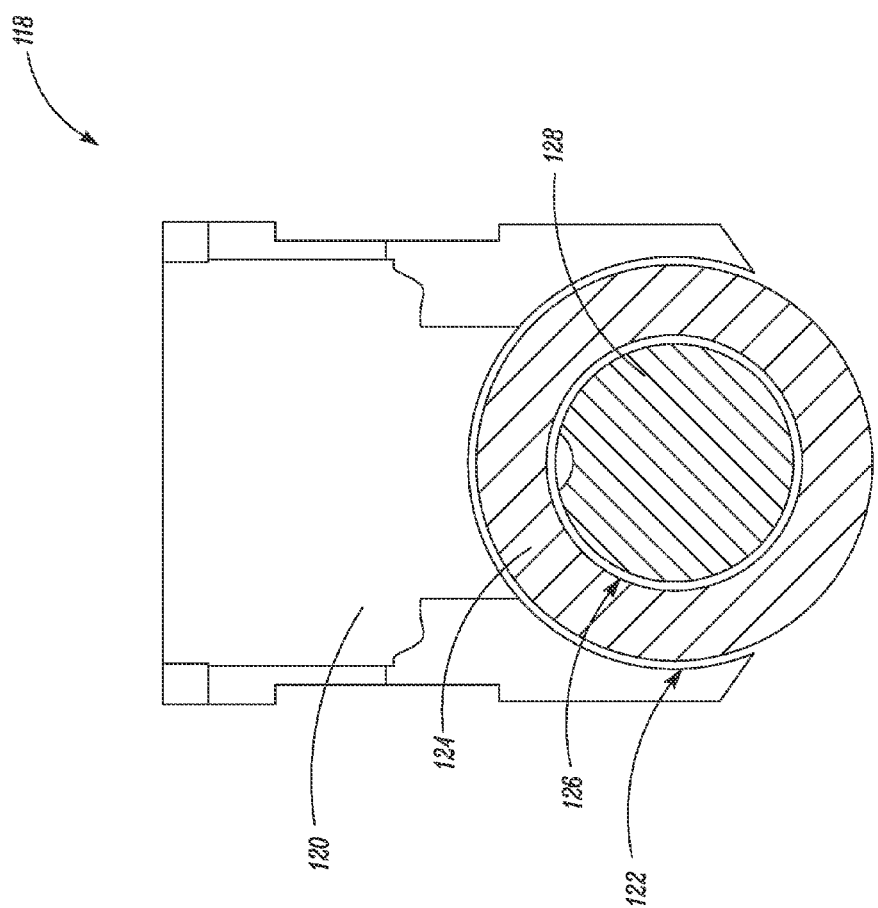
FIG. 2 illustrates a sectional view taken at section Z-Z' of the plunger assembly associated with the fuel pump of FIG. 1.

Each of the plunger assembly 114 includes a resilient member 116 such as a coil spring. The resilient member 116 may be configured to bias the plunger assembly 114 towards the camshaft 110. The plunger assembly 114 further includes a cam actuated roller assembly 118. The cam actuated roller assembly 118 includes a cam follower 120. FIG. 2 illustrates a sectional view taken at section Z-Z' of the plunger assembly 114 of FIG. 1. The cam follower 120 defines a cavity 122 such that a cam roller 124 may be disposed in the cavity 122. As illustrated in FIGS. 1 and 2, the cam roller 124 defines a bore 126. The cam actuated roller assembly 118 further includes a roller pin 128 received in the bore 126 and extending into the cavity 122 such that the cam roller 124 may be rotatably supported on the roller pin 128.

FIG. 3 illustrates a perspective view of the roller pin 128 associated with the cam actuated roller assembly 118. The roller pin 128 includes a cylindrical body 130 extending between a first end 132 and a second end 134. The cylindrical body 130 is made of a first material 136 and has a length L1 and a diameter D1. The roller pin 128 further includes an intermediate portion 138 disposed between the first end 132 and the second end 134 of the cylindrical body 130. The intermediate portion 138 is formed by depositing a second material 140 on the cylindrical body 130. A length L2 of the intermediate portion 138 corresponds to a width of the cam roller 124 such that the cam roller 124 may rotate on the intermediate portion 138 of the roller pin 128. A portion of the cylindrical body 130 adjacent to the first end 132 defines a first portion 142 and a portion of the cylindrical body 130 adjacent to the second end 134 defines a second portion 144 of the cylindrical body 130. As illustrated in FIG. 3, the first portion 142 and the second portion 144 are of the first material 136 same as of the cylindrical body 130. The first portion 142 includes a front opening 146 and the second portion 144 includes a rear opening 148 disposed along a longitudinal axis A-A' of the cylindrical body 130.

FIG. 4 illustrates a cross-sectional view of the roller pin 128 of FIG. 3. The roller pin 128 includes a first fluid passage 150 and a second fluid passage 152 extending from the front opening 146 and the rear opening 148, respectively. As illustrated in FIGS. 3 and 4, the roller pin 128 further defines a longitudinal groove 154 extending along the intermediate portion 138 and lying on the longitudinal axis A-A'. The longitudinal groove 154 is formed by removing a portion of the deposit of the second material 140 from the intermediate portion 138. The longitudinal groove 154 includes a concave cavity 156 having a first opening 158 and a second opening 160. As illustrated in FIG. 4, the first opening 158 is fluidly connected to the first fluid passage 150 via a third fluid passage 162 and the second opening 160 is fluidly connected to the second fluid passage 152 via a fourth fluid passage 164.

Although it is illustrated herein that the third fluid passage 162 and the fourth fluid passage 164 are fluidly connected to opposite ends of the first fluid passage 150 and the second fluid passage 152 respectively, one may contemplate other configurations wherein the third and the fourth fluid passages 162, 164 are fluidly connected at any position along the length of the first and the second fluid passages 150, 152 respectively.

In an embodiment, the roller pin 128 may include respective locating recesses 166 at the first end 132 and the second end 134 to couple the roller pin 128 to the cam follower 120 via respective locating pins (not shown) disposed on the cam follower 120. However, in alternative embodiments, the roller pin 128 may be coupled to the cam follower 120 by other commonly known methods in the art such as press fitting.

In an embodiment the first material 136 may be carburized heat-resistant steel alloy. However, in alternate embodiments, one may choose other suitable materials having structural properties of carburized heat-resistant steel alloy as the first material 136 of the cylindrical body 130. Further, the second material 140 may be silica bronze deposited on the cylindrical body 130 by a thermo-metal spraying process. Thus, one may contemplate other material and/or alloy having suitable lubricating properties as the second material 140 of the intermediate portion 138.

Figure 5:
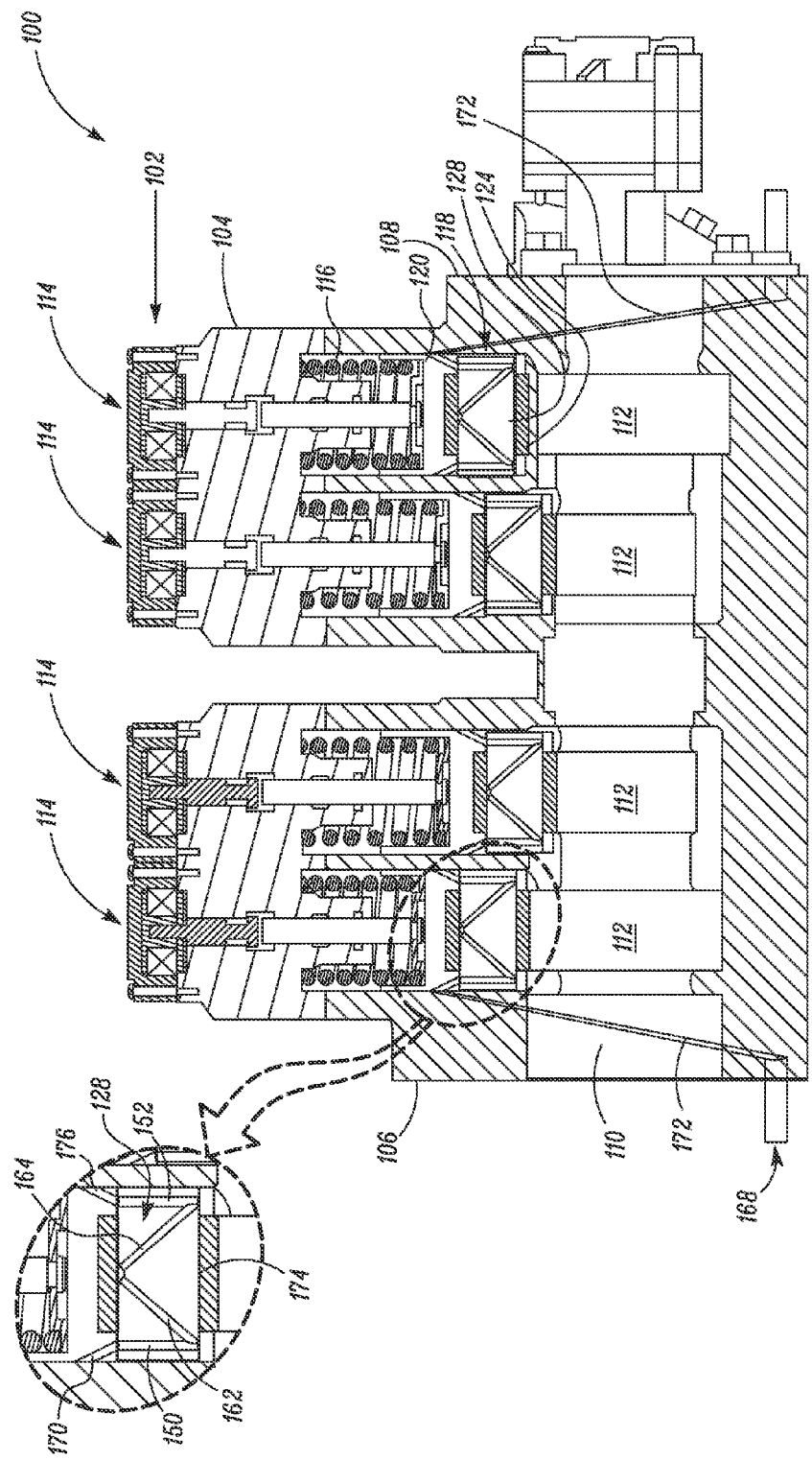
FIG. 5 illustrates another detailed view of the fuel pump of FIG. 1.

FIG. 5 illustrates a detailed view of the fuel pump 100 of FIG. 1. In an aspect of the present disclosure, engine oil is supplied under pressure from an engine lubrication system 168 to the fuel pump 100 via an oil inlet 170. The oil inlet 170 is provided on the cam follower 120 to supply the engine oil for lubrication in the plunger assembly 114. The oil inlet 170 is connected to an oil line 172 fluidly coupled to the engine lubrication system 168. During operation of the fuel pump 100, the plunger assembly 114 receives the engine oil through the oil inlet 170. The engine oil enters the front opening 146 and the longitudinal groove 154 of the roller pin 128 where the engine oil may be retained in the longitudinal groove 154. As illustrated in the cross-sectional view in FIG. 4, the roller pin 128 includes the first, second, third, and fourth fluid passages 150, 152, 162, and 164. The engine oil is thus circulated in the cam actuated roller assembly 118 via the first fluid passage 150, the second fluid passage 152, the third fluid passage 162, and the fourth fluid passage 164 to lubricate an outer surface 174 of the roller pin 128. During operation of the cam actuated roller assembly 118, the roller pin 128 may rotate and reciprocate within the cam follower 120 and thus lubricate the cam follower 120 and the cam lobes 112 associated thereto. The engine oil may exit from an oil outlet 176 to be received in the oil line 172.

Although, it is disclosed herein that the roller pin 128 is implemented in the fuel pump 100 including the cam actuated roller assembly 118, a person having ordinary skill in the art may acknowledge that the fuel pump 100 disclosed herein in exemplary in nature and hence, non-limiting of this disclosure. Any assembly, or machine including one or more rotatable and following members, which are embodied as the cam lobes 112 and the cam followers 120 in the present disclosure, may employ the roller pin 128 disclosed herein.

INDUSTRIAL APPLICABILITY

The industrial applicability of the roller pin 128 for the fuel pump 100 described herein will be readily appreciated from the foregoing discussion. The roller pin 128 of the present disclosure combines high strength characteristics of steel and low friction characteristics of bronze. The cylindrical body 130 is made of carburized heat-resistant steel. Thus, allowing the first portion 142 and the second portion 144 to have an improved load bearing strength. In an embodiment, the roller pin 128 and the cam follower 120 have a similar coefficient of thermal expansion since the cylindrical body 130 and the cam follower 120 are made of a similar material such as carburized heat-resistant steel. Hence, due to a similar coefficient of thermal expansion, a relative displacement of the roller pin 128 within the cam follower 120 is reduced during operation at high temperatures.

Moreover, the intermediate portion 138 has a deposit of silica bronze. Thus, allowing the roller pin 128 to have a low friction between the cam roller 124 and the roller pin 128. Further, the second material 140 is deposited on the intermediate portion 138 using a thermo-metal spraying technique. Hence retention of the second material 140 to the cylindrical body 130 is improved. With the thermo-metal spraying process, various other materials/alloys having friction resistant properties may be easily deposited over the cylindrical body 130 of the roller pin 128.

Figure 6:
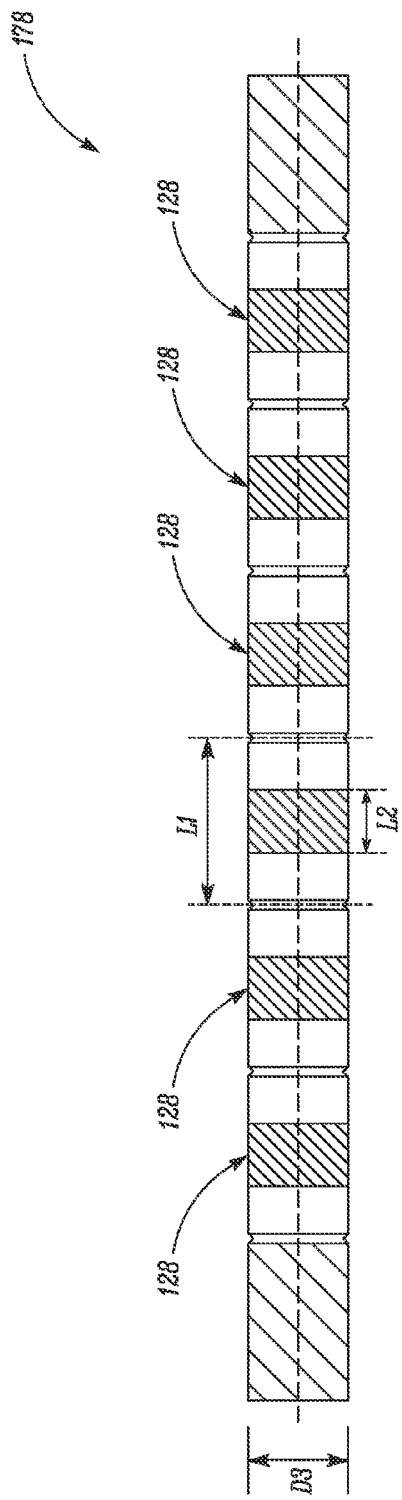
FIG. 6 illustrates an exemplary carburized heat-resistant steel rod for manufacturing a plurality of roller pins of FIG. 3.
Figure 7:
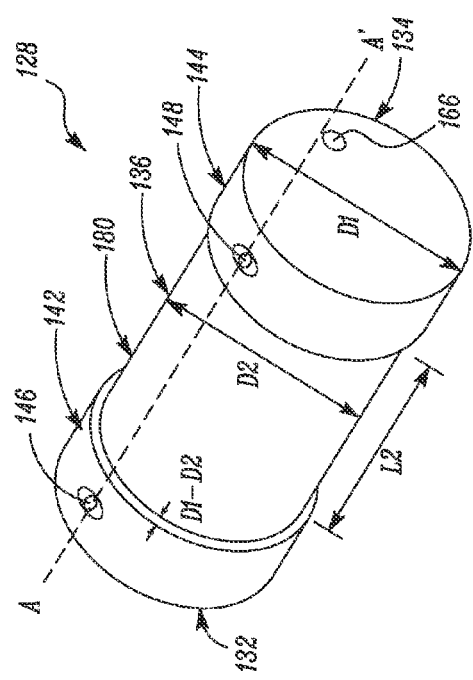
FIG. 7 illustrates a perspective view of the roller pin of FIG. 3, during a manufacturing process.

According to an exemplary embodiment of the present disclosure, a method for manufacturing the roller pin 128 is disclosed herein. FIG. 6 illustrates an exemplary carburized heat-resistant steel rod 178 for manufacturing a plurality of roller pins 128 of the present disclosure. The carburized heat-resistant steel rod 178 has a diameter D3 (where D3 is greater than D1). An initial step for a mass production of the roller pin 128 includes providing markings on the carburized heat-resistant steel rod 178 substantially equal to the length L1 of the roller pin 128. The length L1 of the roller pin 128 is such that existing cam actuated roller assemblies may use the roller pin 128 of the present disclosure without any structural modification. FIG. 7 illustrates a perspective view of the roller pin 128 during a manufacturing process. The method includes removing the first material 136 from the outer surface 174 of the cylindrical body 130 to define an annular undercut portion 180. The annular undercut portion 180 having the length L2 and a diameter D2. The method includes depositing the second material 140 over the annular undercut portion 180 by the thermo-metal spraying technique to form the intermediate portion 138. In an embodiment, the second material 140 sprayed on the intermediate portion 138 is silica bronze. A thickness (D1-D2) of the deposit is such that the intermediate portion 138 has an outer diameter which is equal to the diameter D1 of the cylindrical body 130. In an exemplary embodiment, the thickness of the deposit (D1-D2) of the second material 140 is in a range of about 50 µm to 200 µm. The method further includes removing a portion of the deposit of the second material 140 from the intermediate portion 138 to define the longitudinal groove 154. The method further includes providing the concave cavity 156 on the longitudinal groove 154.

After providing the concave cavity 156, a cutting operation may be performed on the carburized heat-resistant steel rod 178 to obtain the individual roller pins 128. The method further includes providing the first opening 158 and the second opening 160 in the concave cavity 156. The method further includes providing the first fluid passage 150 and the second fluid passage 152 at the first end 132 and the second end 134 respectively. The method further includes fluidly connecting the first opening 158 to the first fluid passage 150 via the third fluid passage 162 and fluidly connecting the second opening 160 to the second fluid passage 152 via the fourth fluid passage 164.

From the foregoing it will be appreciated that, although specific embodiments have been described herein for purposes of illustration, various modifications or variations may be made without deviating from the spirit or scope of inventive features claimed herein. Other embodiments will be apparent to those skilled in the art from consideration of the specification and figures and practice of the arrangements disclosed herein. It is intended that the specification and disclosed examples be considered as exemplary only, with a true inventive scope and spirit being indicated by the following claims and their equivalents.

What is claimed is:

1. A roller pin for a fuel pump comprising:
    a cylindrical body made of a first material extending between a first end and a second end, the first end and the second end having an outside diameter equal to a first diameter;
    an intermediate portion disposed between the first end and the second end of the cylindrical body, the intermediate portion including a second material disposed continuously about a surface of the cylindrical body positioned from the first end to the second end, the intermediate portion having an outside diameter equal to the first diameter; and
    a longitudinal groove extending along the intermediate portion;
    wherein the first material has a greater strength characteristic than the second material and wherein the second material has a lower coefficient of friction than the first material.

2. The roller pin of claim 1, wherein the longitudinal groove comprises a concave cavity having a first opening and a second opening.

3. The roller pin of claim 2 further comprising a first fluid passage and a second fluid passage at the first end and the second end of the cylindrical body, respectively.

4. The roller pin of claim 3, wherein the first opening is fluidly connected to the first fluid passage via a third fluid passage.

5. The roller pin of claim 3, wherein the second opening is fluidly connected to the second fluid passage via a fourth fluid passage.

6. The roller pin of claim 1, wherein the first material is carburized heat-resistant steel.

7. The roller pin of claim 1, wherein the second material is silica bronze.

8. A fuel pump comprising at least one cam actuated roller assembly, the cam actuated roller assembly comprising:
    a cam follower defining a cavity;
    a cam roller accommodated in the cavity, the cam roller defining a bore; and
    a roller pin received in the bore and extending into the cavity, the roller pin rotatably supporting the cam roller, the roller pin comprising:
        a cylindrical body made of a first material extending between a first end and a second end, the first end and the second end having an outside diameter equal to a first diameter;
        an intermediate portion disposed between the first end and the second end of the cylindrical body, the intermediate portion including a second material disposed continuously about a surface of the cylindrical body positioned from the first end to the second end, the intermediate portion having an outside diameter equal to the first diameter; and
        a longitudinal groove extending along the intermediate portion;
        wherein the first material has a greater strength characteristic than the second material and wherein the second material has a lower coefficient of friction than the first material.

9. The fuel pump of claim 8, wherein the longitudinal groove comprises a concave cavity having a first opening and a second opening.

10. The fuel pump of claim 9, wherein the roller pin further comprising a first fluid passage and a second fluid passage at the first end and the second end respectively.

11. The fuel pump of claim 10, wherein the first opening is fluidly connected to the first fluid passage via a third fluid passage.

12. The fuel pump of claim 10, wherein the second opening is fluidly connected to the second fluid passage via a fourth fluid passage.

13. The fuel pump of claim 8, wherein the first material is carburized heat-resistant steel.

14. The fuel pump of claim 8, wherein the second material is silica bronze.

15. A method of manufacturing a roller pin for a fuel pump comprising:

removing a first material from an outer surface of a cylindrical body to define an annular undercut portion between a first end and a second end of the cylindrical body, the first end and the second end having an outside diameter equal to a first diameter;

depositing a layer of a second material continuously over the undercut portion by thermo-metal spraying to form an intermediate portion positioned from the first end to the second end, the intermediate portion having an outside diameter equal to the first diameter;

removing a portion of the layer of the second material from the intermediate portion to define a longitudinal groove; and providing a concave cavity within the longitudinal groove;

wherein the first material has a greater strength characteristic than the second material and wherein the second material has a lower coefficient of friction than the first material.

16. The method of claim 15 further comprising providing a first opening and a second opening in the concave cavity.

17. The method of claim 15 further comprising providing a first fluid passage and a second fluid passage at the first end and the second end respectively.

18. The method of claim 17 further comprising fluidly connecting the first opening to the first fluid passage via a third fluid passage.

19. The method of claim 15 further comprising fluidly connecting the second opening to the second fluid passage via a fourth fluid passage.

20. The method of claim 15 wherein depositing a layer of a second material comprises applying a layer of silica bronze material over the undercut portion.

* * * * *